United States Patent [19]

Stieff

[11] Patent Number: 4,854,702

[45] Date of Patent: Aug. 8, 1989

[54] VEHICLE WHEEL ALIGNMENT APPARATUS AND METHOD OF USE

[75] Inventor: Michael T. Stieff, Wentzville, Mo.

[73] Assignee: Hunter Engineering Company, Bridgeton, Mo.

[21] Appl. No.: 132,881

[22] Filed: Dec. 14, 1987

[51] Int. Cl.$^4$ .............................................. G01B 11/275
[52] U.S. Cl. ........................................ 356/155; 33/288
[58] Field of Search ............. 356/155; 33/288, 203.15, 33/203.18

[56] References Cited

U.S. PATENT DOCUMENTS

| | | | |
|---|---|---|---|
| 3,953,134 | 4/1976 | Appel et al. | 356/155 |
| 4,095,902 | 6/1978 | Florer et al. | 356/155 |
| 4,097,157 | 6/1978 | Lill | 356/155 |
| 4,154,531 | 5/1979 | Roberts, Jr. et al. | 356/155 |
| 4,239,389 | 12/1980 | Hollandsworth et al. | 356/155 |
| 4,265,537 | 5/1981 | Hunter | 356/155 |
| 4,311,386 | 1/1982 | Coetsier | 356/155 |
| 4,416,065 | 11/1983 | Hunter | 33/203.15 |

Primary Examiner—F. L. Evans
Attorney, Agent, or Firm—Gravely, Lieder & Woodruff

[57] ABSTRACT

A vehicle wheel alignment and checking apparatus for front and rear wheels in which the apparatus has active light beam projecting instruments mounted on the front wheels to project beams longitudinally and transversely between the wheels of the vehicle, passive wheel position instruments on the wheels for reflecting incident beams to the active instruments, a system of mirrors associated with the active and passive instruments and beam targets for utilizing the system of mirrors and targets to find the alignment information, and alignment data indicators responsive to the manipulation of the active instruments and responses from the passive instruments for visually revealing the alignment data and aiding in adjusting the wheels to specified alignment values.

14 Claims, 7 Drawing Sheets

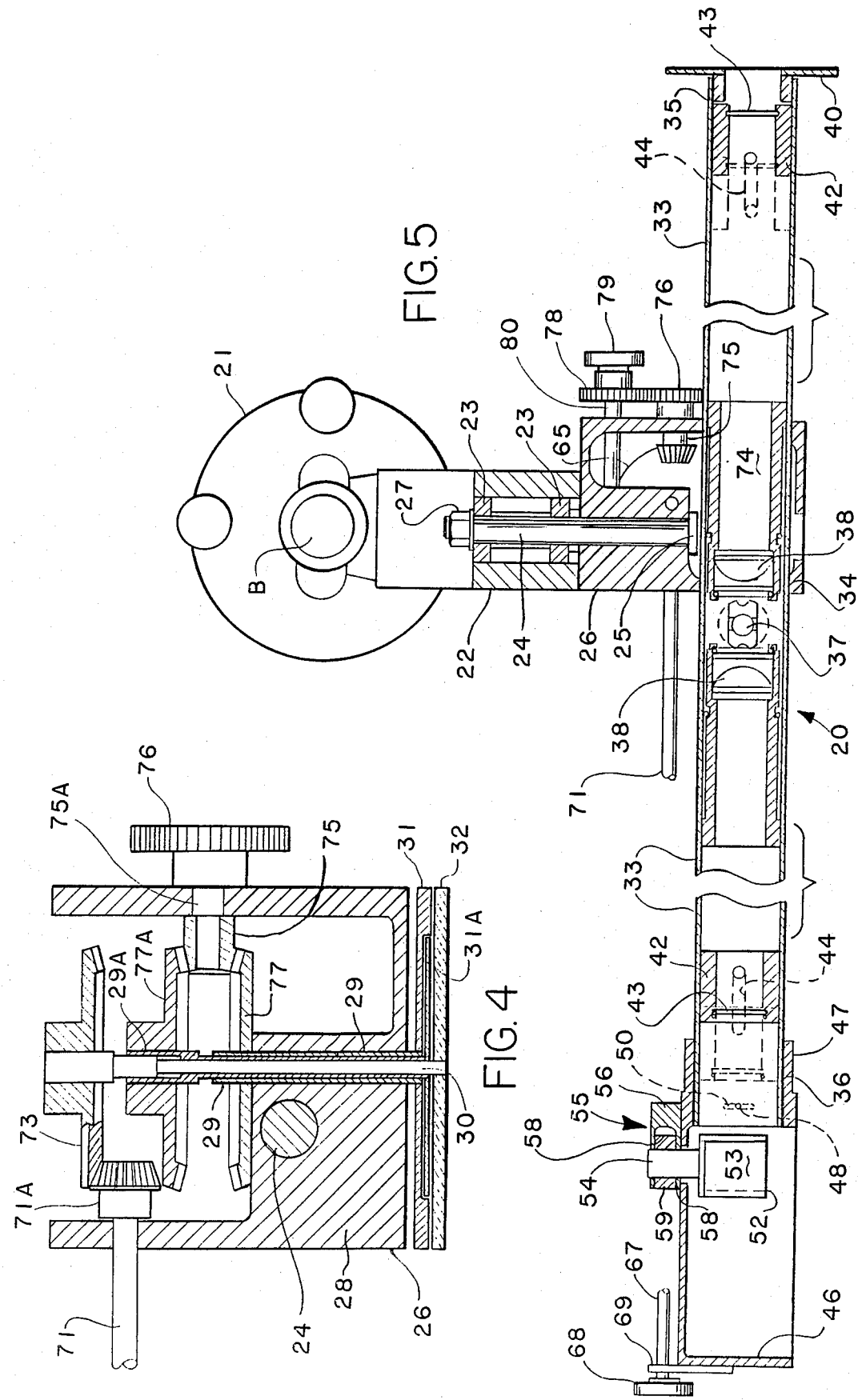

VEHICLE WHEEL ALIGNMENT APPARATUS AND METHOD OF USE

BACKGROUND OF THE INVENTION

1. Field of the Invention

This invention pertains to apparatus useful in connection with checking or even determining 4 four wheel alignment, and to a method for using such an apparatus to check the alignment of vehicle wheels.

2. Description of the Prior Art

The prior art is represented by the various examples, identified hereinafter, of apparatus useful in connection with checking existing alignment of vehicle wheels, in making adjustment in the position of vehicle wheels, or for determining whether the vehicle wheels are reasonably close to being properly aligned. The alignment apparatus has been mechanical, optical or a mixture thereof or it has been substantially electronic in nature.

An example of an optical wheel alignment instrument is disclosed in Appel et al U.S. Pat. Nos. 3,953,134 of Apr. 27, 1976, and apparatus and method for aligning vehicle wheels is disclosed in Hunter 4,416,065 of Nov. 22, 1983.

The prior art also is exemplified by Lill U.S. Pat. No. 4,097,157 of June 27, 1978 wherein elongated tubular light beam projection means is mounted on each of the steerable front wheels and a mirror is mounted on only one of the non-steerable rear wheels. The projecting means has target for receiving the reflected light beam from the mirror, and the projecting means also includes means to project a light beam transversely between the front wheels with means to receive the projected light beam. Readings are received and fed into a calculating logic circuit which calculates the toe angle between the two front wheels using the rearwardly projected beam from only one rear wheel. Such alignment apparatus is useful for finding the toe angle for the front wheels, and requires a suitable electronic calculating means and a display driven by the electronic means.

BRIEF SUMMARY OF THE INVENTION

The apparatus of the present invention includes an instrument for use in checking or determing vehicle wheel alignment of the front and rear wheel. The instrument is embodied in an elongated tubular projector with a light source and two suitable lens and reticle systems in that projector for directing beams of light toward the front end and the rear end of the tubular support, the tubular projector directing a beam rearwardly and receiving back the reflected beam on a target carried by the rear end of the tube. The light beam projected toward the front end of the tubular projector is angularly directed by a movable reflecting mirror across the front of the vehicle width and reflected back to strike upon a target. In order to relate the information provided by the light beams reflected back to the targets, the bodily angular position of the elongated tubular projector to position its rearward target in the path of the reflected beam, and the angular adjustment of the reflecting mirror at the front end of the tubular projector to likewise have the reflected beam trike a target is easily displayed on the dial type indicating means which provides a direct reading of alignment information.

The invention resides in a method for performing vehicle wheel alignment checking which includes the steps of mounting light beam projectors on the front wheels and mirror reflectors on the rear wheels, correcting the position of the projectors and mirrors for wheels runout to avoid introducing rotational errors, positioning the steering wheel in the vehicle for center point steering, adjusting the projectors on the front wheels into alignment of the light beam projectors so they are parallel to the plane of rotation of the front wheels, and providing both a light reflecting mirror and a cooperating scale which can be positioned in the line of sight on the rear wheels.

It is believed the best embodiment of the present invention comprises light beam projectors carried by mounting adapters on the front wheels in position to direct and receive back light beams directed longitudinally between a front and a rear wheel on the same side of a vehicle and transversely between the front wheels, with dial indicators which can give wheel alignment information for four wheel thrust-line determinations, as well as individual wheel alignment.

An object of the present invention is to provide a simple easily used vehicle wheel alignment apparatus that is inexpensive, can give accurate alignment information through directly readable cooperating dials, and affords four wheel alignment checking for thrust-line investigation of the rear or non-steerable wheels.

BRIEF DESCRIPTION OF THE DRAWING

The best mode practice of the present invention can be achieved by the use of instruments which have been disclosed in the accompanying drawing, wherein:

FIG. 4 is a fragmentary plan view of the gear mechanism for operating the relatively movable indicator means in response to the manually operated knobs seen in FIG. 2;

FIG. 5 is a foreshortened longitudinal view on a larger scale of certain portions of the elongated light beam projector to disclose details thereof;

DESCRIPTION OF THE BEST MODE EMBODIMENT

Figure 1:
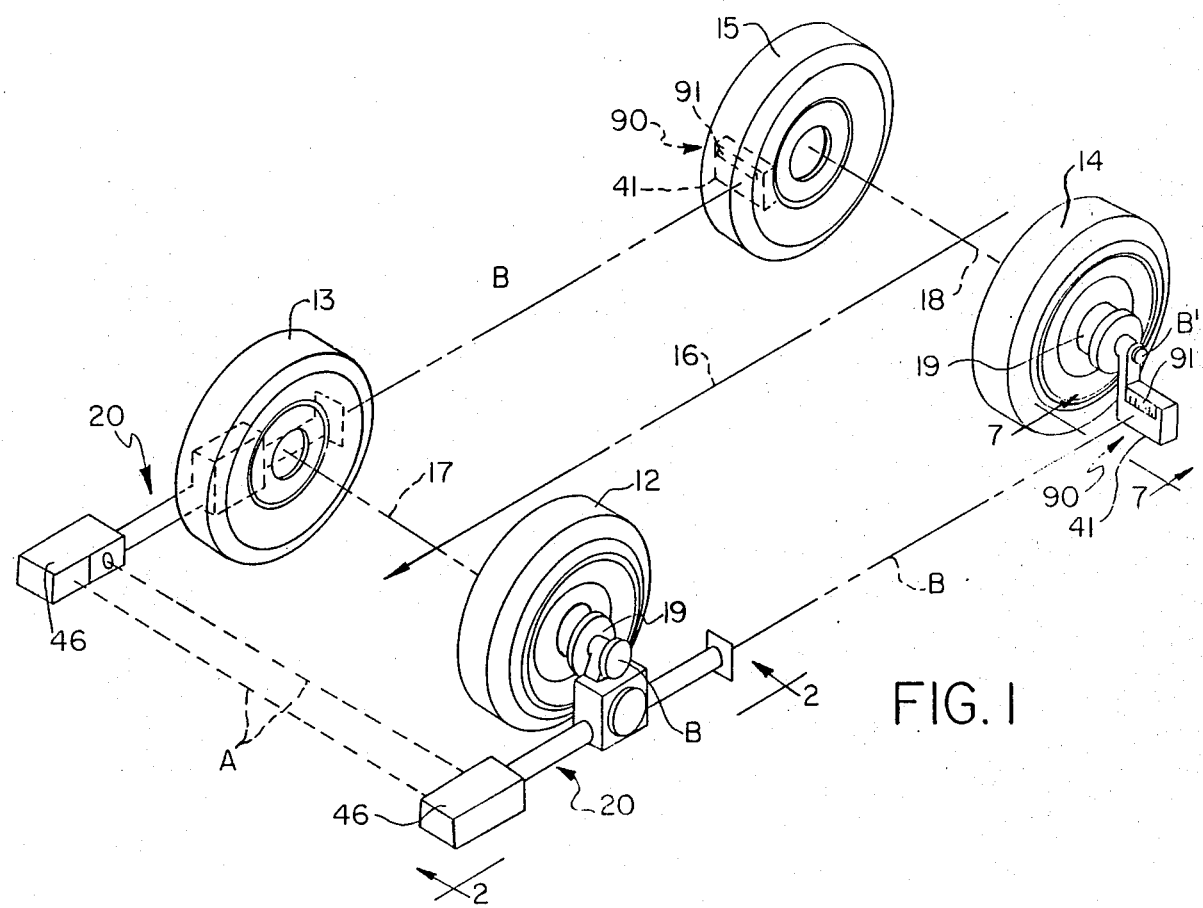
FIG. 1 is a schematic perspective view of the four wheels of a vehicle equipped with light beam projectors and cooperating mirror and scale instrument.

In FIG. 1 there has been disclosed a schematic plan view of the four wheels of a vehicle in which wheels 12 and 13 are the respective front wheels and wheels 14 and 15 are the respective rear wheels. The longitudinal geometric centerline 16 is shown as bisecting the front axle 17 and rear axle 18. Each of the four wheels is provided with representations of an instrument adapter 19 which are essentially the same. Adapter 19, however, is shown more in actual detail in FIG. 2, and reference is made to Hunter U.S. Pat. No. 4,416,065 where the instruments supported on the adapters on the respective wheels 12-15 are seen suspended below the axis of wheel rotation.

Figure 2:
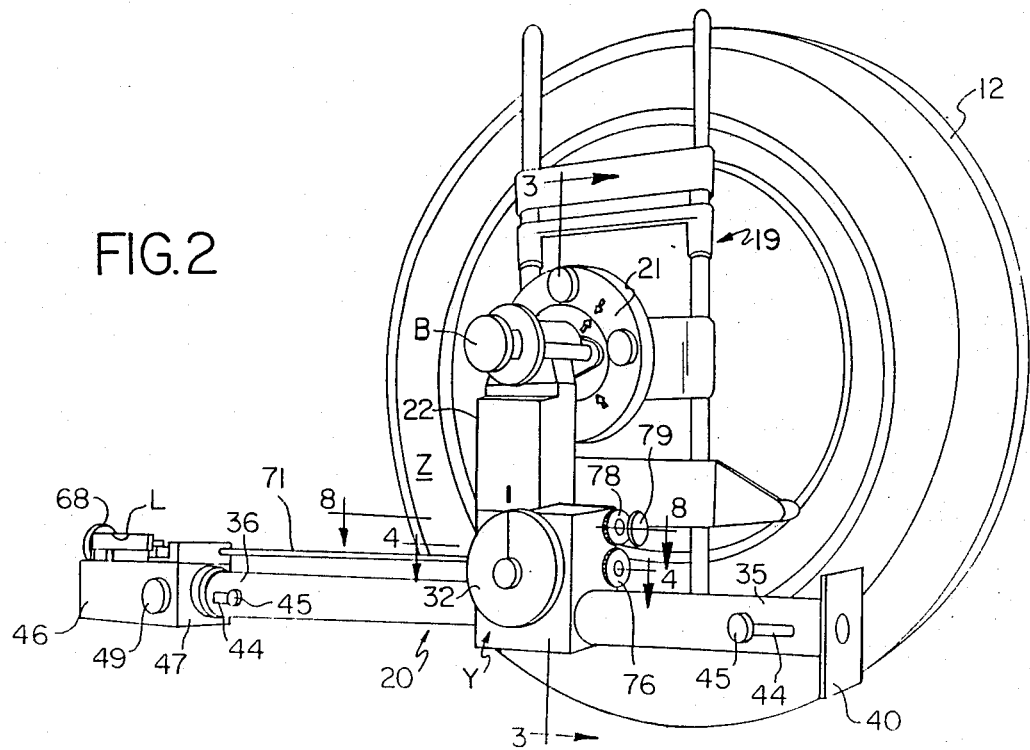
FIG. 2 is a perspective view of the left front vehicle wheel carrying an adapter support for a typical elongated light beam projector and direct reading alignment indicating dials, the view being taken along line 2—2 in FIG. 1 to include certain adjustment provisions not shown in the schematic view of FIG. 1.
Figure 2B:
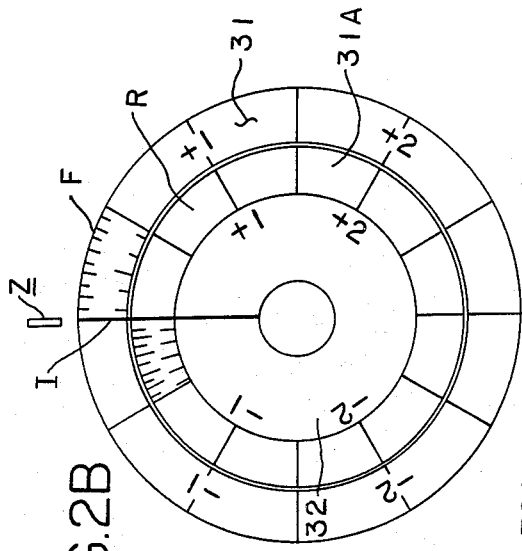
FIG. 2B is a face view of the dials of FIG. 2A when seen in assembly to show the scales through the first dial.

FIG. 2 is a perspective view of an elongated body member which constitutes the active light beam projector instrument 20 that mounts on the outside of the left front wheel 12 by the adapter 19. It can be seen that the adapter carries a runout compensating device 21 for bringing the instrument 20 into a position parallel with the plane of wheel rotation. All of the adapters 19 are the same, as is well known in the prior art, and need not be described further. The active instruments 20 are carried on the front wheels. Each instrument has a casting 22 (see FIG. 3) that supports internal bearings 23 to engage a vertical shaft 24 formed at its lower end with a flange 25 to support an instrument housing 26 for pivoting movement in a circular path with its center in the axis of the shaft 24. The upper end of the shaft 24 has a securing nut and washer combination 27 to fix the shaft 24 but to allow ease of pivoting movement of the instrument housing 26 relative to the casting 22. The housing 26 has an internal boss 28 with a bore extending horizontally (see FIG. 4) to receive concentric rotatable sleeves 29, and 29A and an internal shaft 30 which also rotates independently of the sleeves 29, and 29A. Sleeves 29 and 29A engage gears 77 and 77A respectively which in turn are both engaged by gear 74 and by their relationship to shaft 75 and gear 76 rotate independently of each other but in equal and opposite directions. In the perspective view of FIGS. 2 and 2A, there can be seen an alignment display instrument Y consisting of opaque dials 31 and 31A behind a transparent front dial 32. The dials 31 and 31A carry scales F and R readable in degrees of arc, while the transparent dial 32 allows the scales F and R to be easily seen through it. The dial 32 carries a single scribed line which is referred to as pointer I that can move over the scales F and R for indicating value F and/or R of degrees of arc from the dials 31 and 31A. Instead of a full transparent dial 32, the pointer I can just as well be a single hand that can be moved to sweep over scales F and R as well as assume positions relative to the scale valves on the scales F and R.

While the view of FIG. 2 has disclosed mechanically manipulated visual means, it is appreciated that other suitable means may be substituted for the gears of FIGS. 4 and 2 to drive electronic means to produce analog of digital reading similar to the values seen on the scales F and R.

The elongated light beam instrument 20 (FIG. 5) comprises housing in the form of a tube 33 which extends through a receiving opening 34 in housing 26 (FIG. 3) and extends from a rearward end 35 to a forward end 36. A spirit level L (FIG. 2) is mounted on the housing 26 at any convenient place so the tube can be levelled in a horizontal position. A source of light or radiant energy, such as bulb 37 is carried in the tube 33 near the housing 26 and suitable sets 38 of condensing lenses and cooperating reticles are mounted at the rear and front sides of the bulb 37 so that the light beam can be formed into a crossed form to provide vertical and horizontal filaments. The rearward end 35 of the tube 33 supports a target plate 40 (FIG. 2) which has a central opening for passage of the beam to a passive instrument 90 at the rear wheel which is reflected from the mirror 41 (see FIG. 7) back to the target 40. The vertical and horizontal beam filaments are intended to match similarly positioned scribed lines (FIG. 2) on the target plate 40, as will be referred to presently. There is a beam focusing sleeve 42 and lens 43 slidably mounted in the end 35 of the tube 33, and a slot 44 in the tube 33 allows a knob 45 to project through the slot so the sleeve 42 may be positioned and secured to develop a sharp beam image on the mirror 41 of the passive instrument 90 carried by the mounting adapter 19 on the rear wheel 14.

The front end 36 of the tube 33 is provided with a beam focusing sleeve 42 and lens 43 slidably mounted in that end similar to the one mounted in the rearward end 35. A knob 45 works in a slot 44 to focus and secure the position of the lens 43. In addition, the forward end 36 of the tube 33 carries a housing 46 formed with a tubular sleeve 47 which fits snugly over the end 36 of the tube 33. The housing 46 fits far enough over the tube 33 to allow a pin 48 on the inner end of a knob 49 to engage in a circumferentially directed slot 50 in the tube 33 so that the housing 46 can rotate on the end of the tube 33, within the limits of the slot 50 when the knob 49 has been backed off from its position to secure the housing 46 on the tube 33.

Figure 9A:
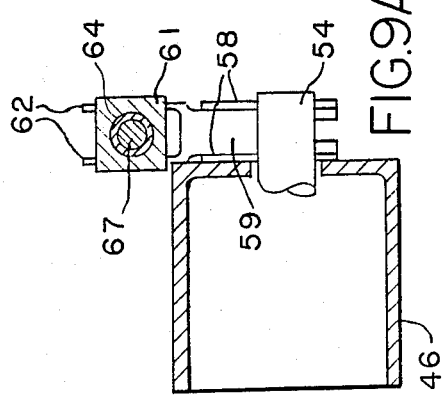
FIG. 9A is a sectional view of the assembly of FIG. 9 taken along line 9A—9A.
Figure 9:
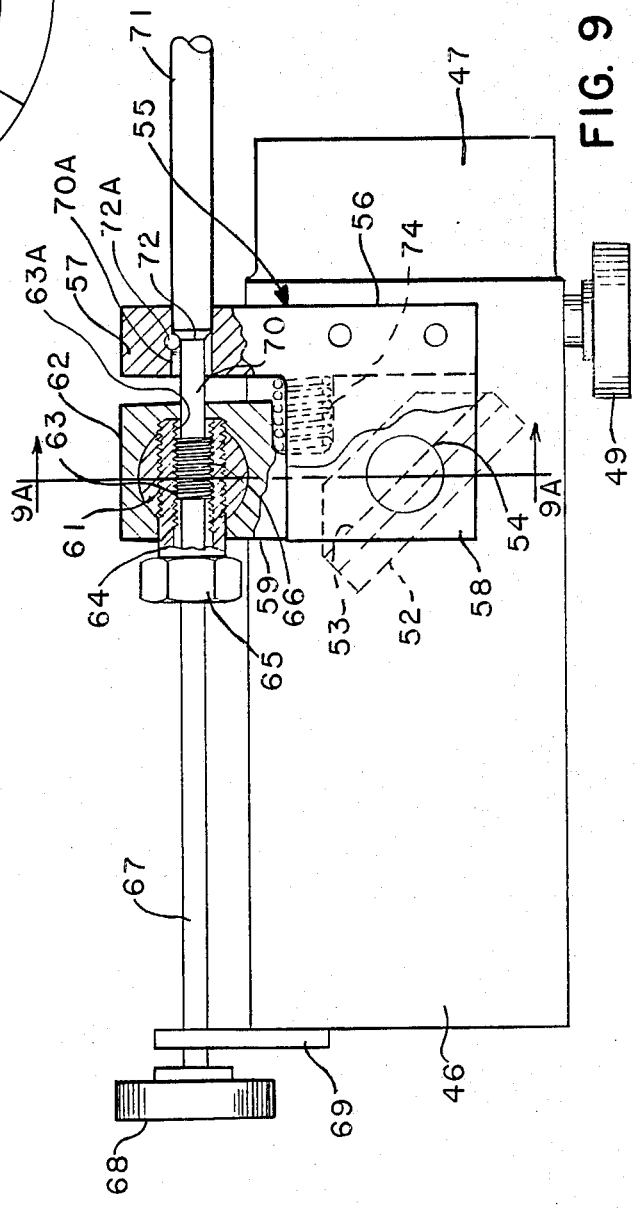
FIG. 9 is a plan view with portions in section of the activating assembly for varying the angular position of the mirror mounted in the forward end portion of the projector of FIG. 5.

The housing 46 on the forward end 36 of the tube 33 supports a mounting 52 for a mirror 53 on the inside of the housing. The mounting 52 has a shaft 54 that projects through the top of the housing and connects into a mirror adjusting assembly 55 which is seen in FIGS. 5, 9 and 9A. That assembly 55 includes a clevis-type support 56 that is secured to the housing 46 so that a projecting arm 57 reaches out beyond the vertical surface of the housing. The support 56 has vertically spaced and laterally extending flanges 58 with one being seen on top, while the companion underlying flange 58 is positioned against the top of the housing 46. The space between the flanges 58 receives a movable block 59 pivotally mounted between the flanges 58 on pivot shaft 54 that extends into the housing and is connected to the mirror mounting 52. The pivot shaft 54 is secured to the block 59 by a suitable set screw (not shown). The pivot means 54 carries the mounting 52 and with the block 59 is free to rotate relative to the spaced flanges 58 so that when the block 59 is pivoted about the axis of the pivot means 54 the mirror 53 and its mounting 52 will also pivot. The view of FIG. 9 shows the mirror in a position at 45° to the axis of the light beam from the light source 37, but by pivoting the mirror in either direction from that position, the reflected beam can follow a path that varies from the path with the mirror at the 45° setting relative to the light source 37. The assembly can accommodate a movement of the mirror 53 to either side of the 45° angular relationship.

The part of the assembly 55 that effects the angular movement of the mirror 53 includes a rotatable support 61 of cylindrical shape and rotatably operative in and between the upper and lower arms 62 (FIG. 9A) that project from the block 59. The support 61 is formed with a transversely directed threaded bore 63 for the reception of an adjusting sleeve 64 that has a manipulating nut 65 on its outer end. The sleeve has external threads that are received in the threaded bore 63 of the support 61, and is internally threaded at 63A to mate with a threaded section 66 of an elongated rod section 67. That section 67 of the rod extends from the threaded section 66 to a knob 68 supported in a bracket 69 fastened on the end wall of the housing 46. Extending in the opposite direction from the threaded section 66 is a necked down section 70 that extends to an enlarged section 71 to form a shoulder 72. The shoulder 72 is located so it abuts a pin 72A which intercepts the horizontal bore 70A in the arm 57 on the clevis support 56. Any looseness in the operating elements of the assembly 55 is taken up by a resilient element or spring 74 which is caged in a suitable socket in the side of block 59 which directs the spring to press outwardly against the fixed clevis-type support arm 56. This action loads the block 59 in a direction to pull the section 70 by section 66 so shoulder 72 abuts pin 72A so the position of the mirror 53 in the frame 52 will be stable.

The operation of the assembly 55 is intended to provide a way of adjusting the direction of the light beam reflected off of the mirror 53 at other than 45° to the light beam directed axially along the tube 33 from the light source 37. The pitch of the meshing threads between the sleeve 64 and the section 66 of the elongated rod 67 is such that rotation of the knob 68 through 720° will cause the arm 62 to swing through an angle of 3° about the axis of the pivot means 60 for the mirror. This movement may be 1.5° to either side of a mirror position reflecting the light beam at 45° to the longitudinal axis of the beam from the light source 37. Thus, two full rotations of the knob 68 will swing the arm 62 through 3° of movement.

During turning of the knob 68 the rod section 71 will rotate in response and that will rotate a bevel gear 71A in the housing 26 (see FIG. 4). Rotation of bevel gear 71A drives the larger bevel gear 73 which rotates the shaft 30 which, in turn, rotates the transparent dial 32.

There is a 4:1 ratio in the gears 71A and 73 so that four turns of the bevel gear 71A will rotate bevel gear 73 one turn. The extent of angular rotation of the dial 32 will be measured by the travel of the pointer I over the scales F and R carried on the dials 31 and 31A.

Figure 6:
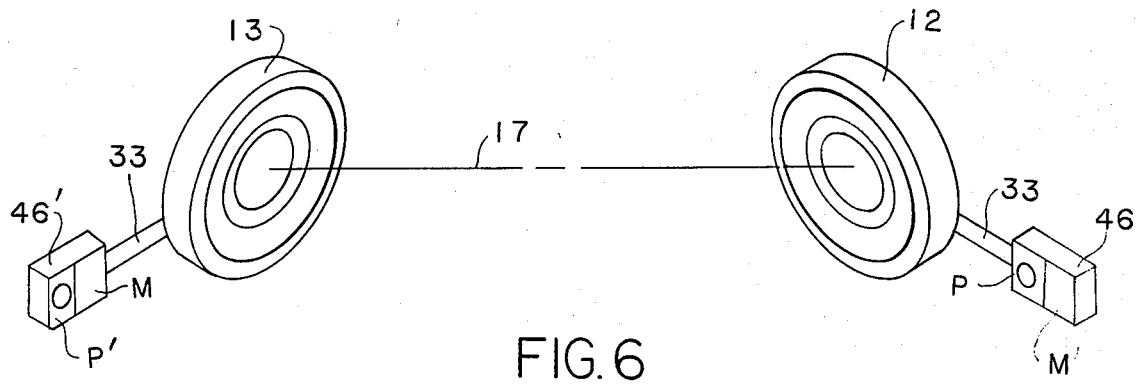
FIG. 6 is a perspective view from the front of FIG. 1 but with the front wheels turned out for the purpose of disclosing the light beam projection openings and the reflection target arrangement.

Referring now to FIG. 6, it is pointed out that only so much of the housing 46 is shown for the purposes of explaining the functions of housings 46 and 46'. The front wheels 12 and 13 have been shown in what can be called an open perspective in which the left front wheel 12 is at the right and the right front wheel 13 is at the left, as if looking at the front wheels toward the rear. The angle of the perspective is chosen to show the inside or facing surfaces of the housings on the forward ends of the elongated beam projector tubes 33. The left front wheel carries the housing 46, and looking at the inside face of that housing there is a first target panel P with a central opening to pass the light beam from the mirror 53. The first target panel P is formed with horizontal and vertical scribed marks to locate the zero reflection of the reticle form of a beam that strikes a first mirror M in the facing surface of the housing 46' carried by the right front wheel 13. The right front wheel 13 is similarly constructed to have the housing 46' on the tube 33, but housing 46' is now farther out so the light beam projected through an opening in the target panel P' is now facing a mirror M' on the housing 46 which reflects the beam back to the target panel P'. Other than the necessary relocation of the components in the housing 46, the function of the light beam reflecting means in housings 46 and 46' are the same. In view of the knob means 49 and slot 50 (see FIGS. 2 and 5) each housing 46 and 46' can be turned to vertically line up the beams on the targets P and P'.

Figure 2A:
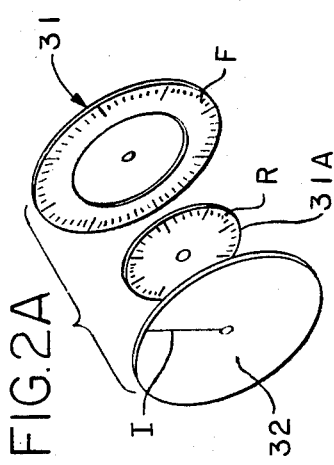
FIG. 2A is an exploded and perspective view of a the direct reading alignment indicating dials.
Figure 3:
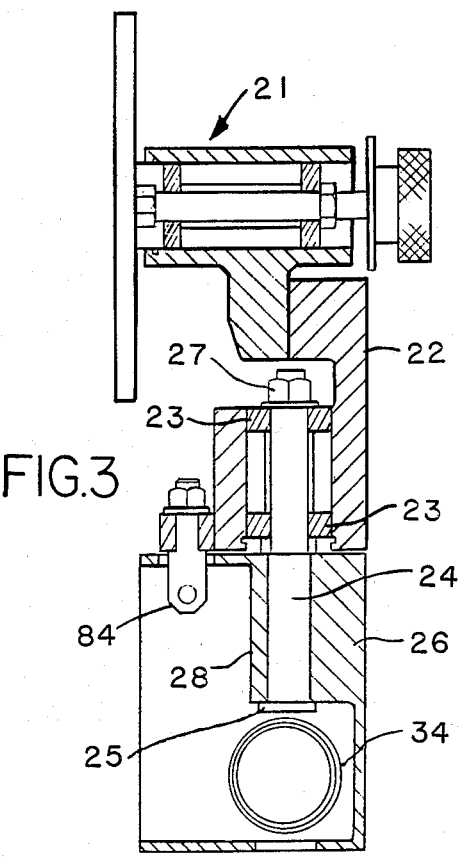
FIG. 3 is a fragmentary sectional view of the pivotal mounting of the light beam projector taken along line 3—3 in FIG. 2.

Turning now to FIGS. 2, 2A and 4, the housing 26 supports the instrument 20 which is the elongated light beam projector tube 33 and dial means 31, 31A and 32 to indicate, upon visual observation, the angular position of the projector tube 33 relative to the plane of the wheel on which it is mounted, and the angular position of the mirror in the assembly 55 carried at the forward end of the tube 33. The view of FIG. 4 is seen to have a bevel gear 71A engaged on a bevel gear 73 which is fixed on the end of the shaft 30. The housing 26 also supports a bevel gear 75 on a stub shaft 75A that projects out of the housing 26 and carries a spur gear 76. The bevel gear 75 drives bevel gears 77 and 77A that are fast on the sleeves 29 and 29A respectively. Also, the spur gear 76 engages a second spur gear 78, (FIGS. 2, 5 and 8) and that gear 78 is rotated by a knob 79. As can be seen in FIG. 2, and with the foregoing description in mind, the manual knob 68 upon being rotated to adjust the angular position of the mirror 53, also rotates shaft section 71 and the shaft 30 in the housing 26 to rotate the transparent dial 32 so the single pointer I thereon represents the angular position of the mirror 53 in the housing 46 at the forward end of the elongated light projector tube 33 of instrument 20. That position of the mirror 53 can have its zero position at 45° or in some other angular position to either side of the 45° position. The knob 79 can be rotated to rotate spur gears 78 and 76 and through the bevel gears 75, 77 and 77A to rotate the sleeves 29 and 29A which rotate the dials 31 and 31A which have scales F and R in degrees of arc. These scales F and R on dials 31 and 31A can be seen through the transparent dial 32. The scales on dials 31 and 31A have zero indicators $F_o$ and $R_o$. The indicia to either side of the zero indices is marked off in positive and negative degrees of arc. Dials 31, 31A and 32 can be turned to zero positions when lined up with a zero marker Z scribed on the face of the fixed casting 22, as seen in FIG. 2.

Figure 8:
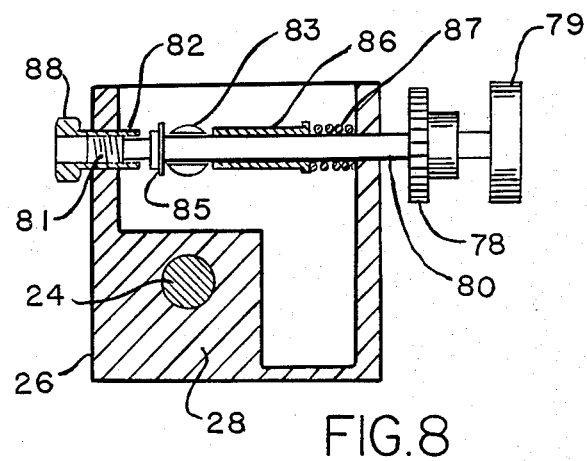
FIG. 8 is a fragmentary sectional view taken along line 8—8 in FIG. 2 which illustrates the drive connection between the light beam projectors and the support therefor.

Attention is directed to FIG. 8 wherein the housing 26 supports a shaft 80 which carries the spur gear 78 and manual knob 79 at its outer end. The inner end of the shaft 80 extends through a sleeve device 82 that develops a reaction in the threaded end 81 for swinging the housing 26 and the elongated light beam projector 20 angularly about the vertical axis of the pivot pin 24. Thus, as the manual knob 79 is turned so that its dials 31 and 31A rotate in opposite directions (see FIG. 11A) away from a zero position Z, the elongated projector instrument 20 (FIG. 5) is swung in a horizontal plane to assume an angular position relative to the plane of rotation of the front wheel on which it is carried. The horizontal swing of the instrument 20 is effected in the following manner, now to be described. In this case it is the left front wheel 12. As seen in FIG. 8 shaft 80 extends through the housing 26 to the adjustment sleeve 82 that is threadedly mounted in the housing 26. The sleeve 82 is internally threaded to receive the threaded end 81 of the shaft 80. The shaft 80 is received in the bifurcated end 83 of a fixed clevis 84 carried by the casting 22 (see FIG. 3). That bifurcated end 83 of the clevis 84 furnishes a fixed surface that is abutted by a flange 85 fixed on shaft 80. The shaft 80 carries a sleeve 86 and a resilient spring 87 at the side of the fixed end 83 opposite the flange 85. Now, when knob 79 is rotated, the threaded end 81 will rotate in the fixed sleeve 82 and that will cause shaft 80 to move axially relative to the fixed end 83 of the clevis 84. Since the fixed end 83 cannot move, the housing 26 will have to move about the axis of the shaft 24 with the result that the housing will turn and swing the elongated instrument 20 relative to the plane of the wheel 12 (see FIG. 2) The threaded sleeve 82 has a nut 88 on its other end so the sleeve 82 can be threadedly moved relative to the shaft 80 in or out of its threaded engagement in the housing 26. This sleeve adjustment is followed up by movement of the sleeve 86 under the action of the spring 87 to take up any looseness in the engagement with the bifurcated end 83 of the clevis 84.

Figure 7:
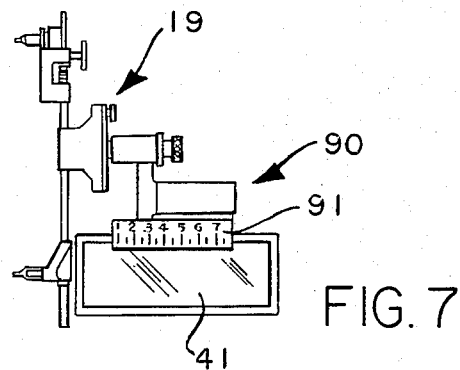
FIG. 7 is a face view in elevation of the mirror and scale instrument as seen along line 7—7 in FIG. 1 which is adapted to be mounted on the left rear wheel, a similar instrument is indicated on the right rear wheel.

Turning now to FIG. 7, and referring also to FIG. 1, it is seen that the passive instrument 90 consists of a mirror and a scale carried on the adapter 19 which supports the instrument on the rear wheel 14. The instrument 90 supports the flat mirror 41, previously referred to, and a target 91 which presents a numeric scale in the same facing direction with the mirror 41. The reticle-formed rear-directed light beam projected from the projector tube 33 on the left front wheel is reflected back by the mirror 41 to the target 40 on the rear end of the projector. When the scale on target 91 is to be used, the vertical light beam filament will be observed to strike the scale and the horizontal pointing of the projector tube 33, relative to the position of the plane of the rear wheel can be determined by reading the numeric value of the scale on target 91.

The foregoing description has been primarily directed to the instruments on the left front and left rear wheels shown in FIG. 1. Reference was made in FIG. 6 to the cooperation of certain components carried on the housing 46 and 46′ of the elongated light beam projector tubes 33. It should also be kept in mind that many of the individual components, and the assemblies into which they fit, need to be made as either lefthand or righthand parts so that the overall function is the same for the instruments at each side of the vehicle. In FIGS. 1 and 2 there is shown a lock knob B for holding the instrument 20 level, and in FIG. 2 there is seen a spirit level L at the front end of the instrument 20. The knob B is loosened to allow the instrument to be levelled by observing the level L and then is tightened to secure the levelling result.

THE METHOD OF REAR WHEEL ALIGNMENT TO THE GEOMETRIC CENTERLINE

Throughout the following description of the method for performing rear wheel alignment to the geometric center line, reference will be made to scale F on dial 31 and scale R on dial 31A. Since the dials 31 and 31A move equal amounts but in opposite directions, according to the gearing seen in FIG. 4, care must be taken to insure that the position of the pointer I on dial 32 is read with respect to the proper scale on dials 31 or 31A. For example, the scale F on dial 31 should be read when determining or measuring front wheel alignment. The scale R on dial 31A should be read when determining or measuring rear wheel alignment. Hereafter in this description, only the pointer I or the scale of the dial of interest will be addressed.

Figure 10:
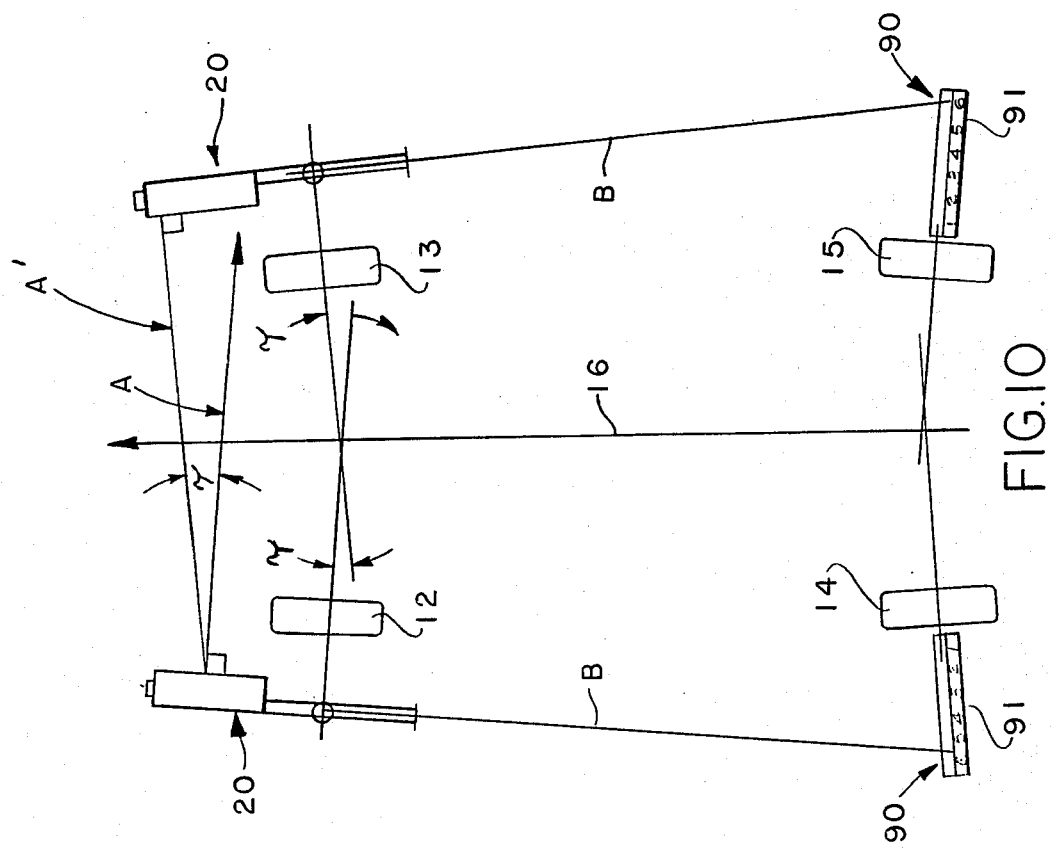
FIG. 10 is a schematic plan view of a vehicle four wheel layout having instruments of FIGS. 2 and 7 associated with the respective front and rear wheels.
Figures 10A, 10B:
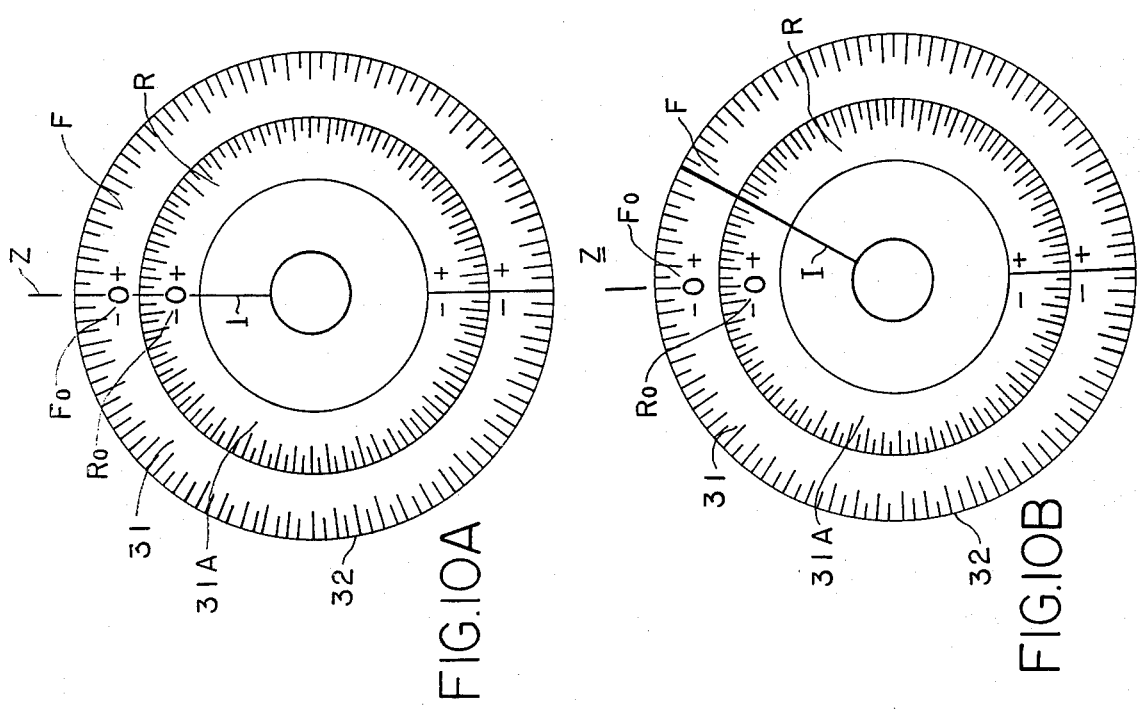
FIG. 10A illustrates the face view of the dials of FIG. 2A when manipulated to the starting positions when preparing to perform an alignment according to FIG. 10.
FIG. 10B is a view where one of the dials seen in FIG. 10A has been manipulated.

Initially, the instruments 20 and 90 operatively mounted at the respective front wheels (12-13) and the rear wheels (14-15) at each side of a given vehicle must be compensated for runout and the dials 31, 31A and 32 on each front wheel instrument 20 must be rotated by the respective manually manipulative knobs 68 and 79. Knob 68 adjusts dial 32 and knob 79 adjusts dials 31 and 31A so initially the scale F on dial 31 and the scale R on dial 31A may have their zero index $F_o$ and $R_o$ aligned with the mark Z on the casting 22, and the knob 68 can bring the single pointer I on dial 32 to line up with the zero indices on dials 31 and 31A. This condition is seen in FIG. 10A and results in the light beams projected by the instrument 20 rearwardly being parallel with the plane of rotation of the front steerable wheels and the light beams projected transversely by the 45° mirrors 53 being perpendicular to the rearwardly projected light beams.

To begin wheel alignment investigation of a vehicle, the rear wheel alignment is first checked. With reference to FIG. 10, the front wheels 12 and 13 together with the instruments 20 mounted on them are steered until the light beams LB that project rearwardly strike the scales 91 on the instruments 90 at the same scale number for each instrument 90. No manipulation of knobs 68 and 79 which have zeroed the scales F and R and the pointer I is had at this time. This results in the toe of the front wheels 12 and 13 being evenly split on each side of the geometric center line 16 of the vehicle. This means the left and right front wheel toe angles are equal with respect to the center line 16, and these angles are equal to one-half the total front to be $\tau$. The transversely projected light beam from the instrument mounted to the left front wheel 12, shown as A (see FIG. 10) remains at a right angle to the plane of rotation of wheel 12. The same condition exists for the front wheel 13. These transverse light beams are not necessarily perpendicular to the opposite instruments 20. The next procedure is to manipulate the light reflecting mirrors 53 in the respective projector tubes 33 to pivot the reflected light beams in a horizontal arc until each beam is in a position (shown at A′ in FIG. 10 for left front wheel 12) to strike its opposite mirror M or M′ and be reflected back to the target P or P' (see FIG. 6). This manipulation of the light beam for the left front wheel 12 is seen at FIG. 10B by the movement of the pointer I clockwise from the zero index Z. The same manipulation of the right front wheel 13 will also occur. The angular pivoting of the reflected light beams is in an amount equal to the total toe $\tau$ of the front wheels in order to make the beams perpendicular to the mirror M and M' on the opposite instruments 20. The angular movement of these light beams is equal to twice the angular movement of the mirrors 53. FIG. 10B shows that the pointer I has moved over the scale R of dial 31A to indicate the amount of rotation of mirror 53. It follows that the amount indicated is half the total movement of the light beam or half the total toe of the front wheels. This value also represents the toe of the individual front wheels (and therefore the instruments) with respect to the geometric centerline.

Figure 11:
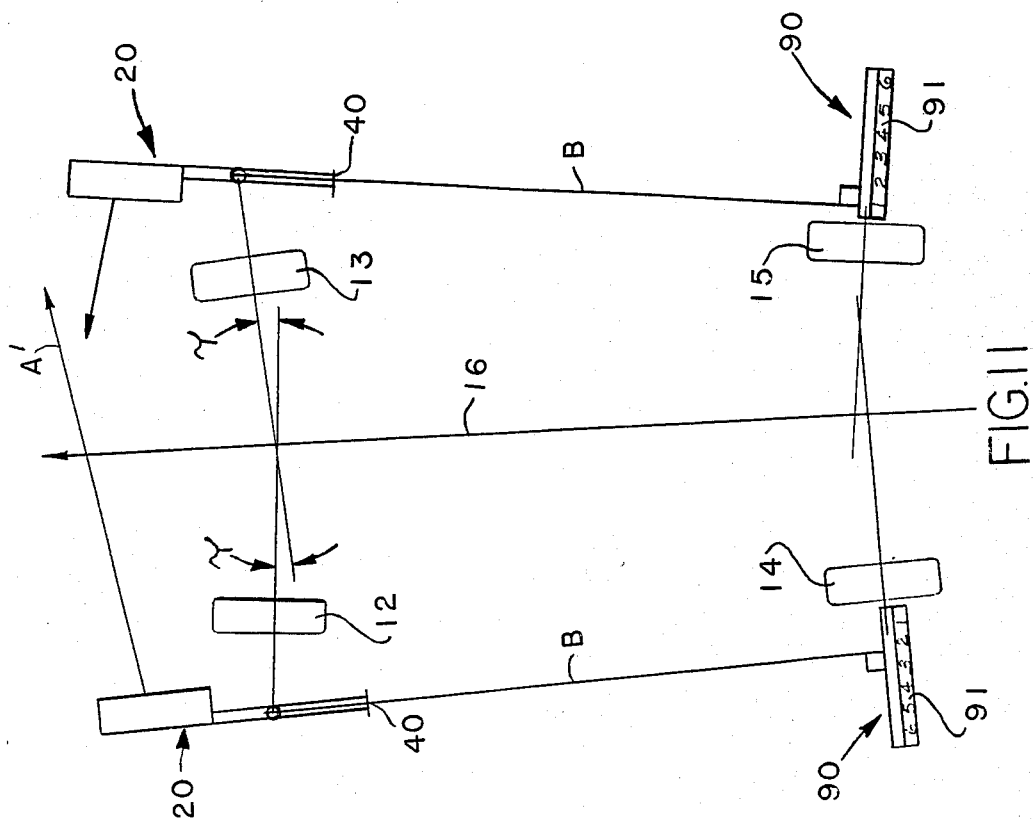
FIG. 11 is a schematic plan view of a vehicle four wheel layout illustrating a wheel position pattern that is a variation of the layout in FIG. 10.
Figure 11A:
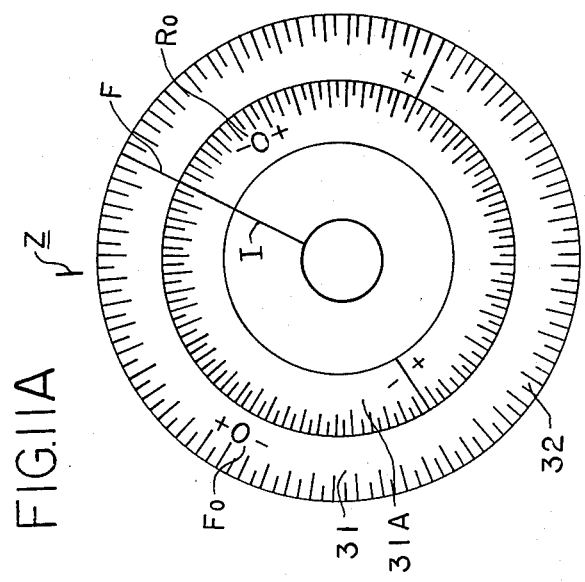
FIG. 11A is a further view of the dials of FIG. 10A after further manipulation thereof has taken place according to FIG. 11.

The instrument 20 is now rotated about pivot shaft 24 by turning knob 79 until the rear projected light beam LB strikes mirror 41 (FIG. 11) on the rear instrument 90 and is reflected back onto target 40, as depicted in FIG. 11. This results in the rear projected light beams LB being aligned parallel to the plane of rotation of the rear wheels 14 and 15. The pivoting of the instruments 20 by turning knob 79 also causes dials 31 and 31A to rotate a corresponding amount (see FIG. 11A). By reading the pointer I of dial 32 relative to the scale of dial 31A (FIG. 11) it is now possible to directly read the toe of the rear wheel in relation to the geometric centerline 16 of the vehicle. This procedure is performed for both rear wheels.

In order to align the rear wheels to a desired setting (assuming these wheels can be adjusted), knob 79 is rotated until the desired scale value is indicated between the pointer I and the scale R of dial 31A. Again, this action also positions the rear projected light beam LB relative to the vehicle geometric centerline at the angle indicated by the selected value. The rear wheel can now be physically adjusted to the indicated position. This rear wheel adjustment is completed when the light beam LB strikes mirror 41 on instrument 90 and is reflected back onto target 40 on the rear end of the instrument 20. This procedure is performed on both rear wheels, and the toe alignment of the rear wheels will be completed.

Figure 12:
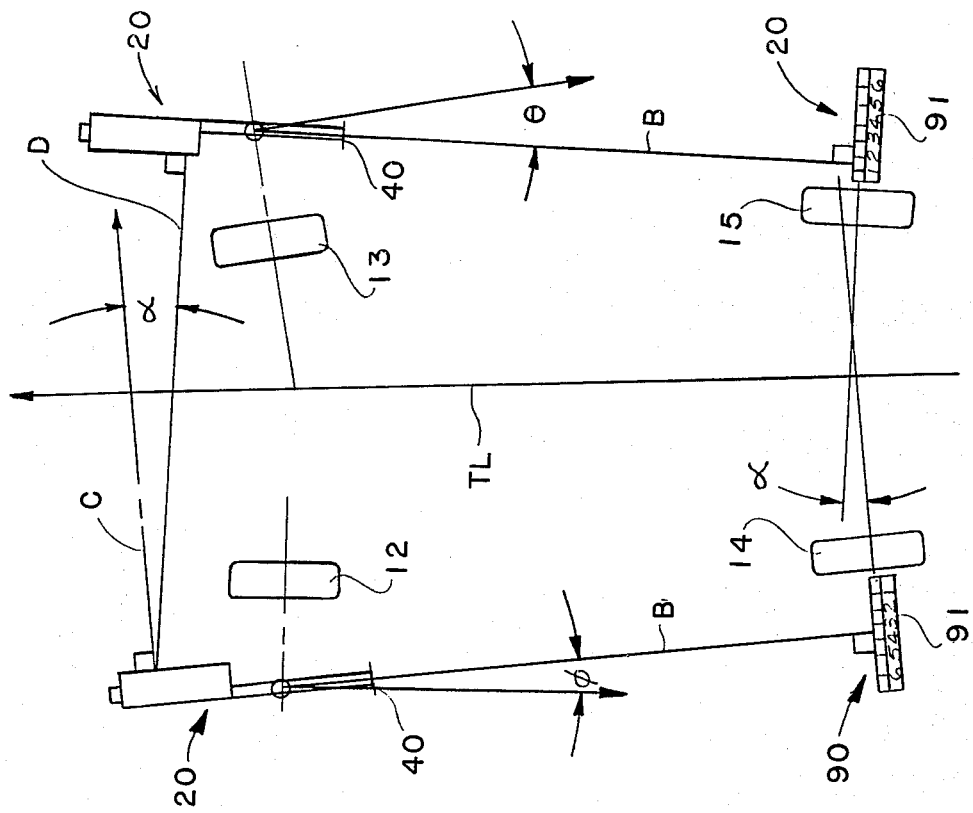
FIG. 12 is a further schematic plan view of a vehicle four wheel layout illustrating a further wheel position pattern.
Figure 12A:
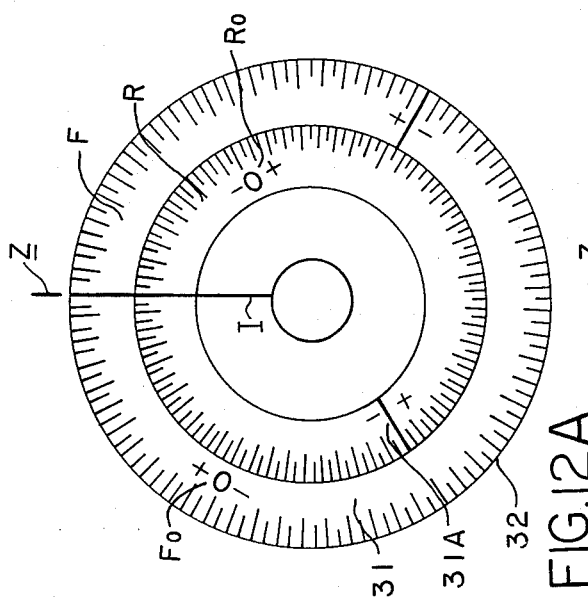
FIG. 12A is a view of the dials where manipulated to a different alignment according to FIG. 12.

To begin an alignment of the front steerable wheels of the vehicles, after the instruments 20 and 90 have been corrected for runout as before explained, the steering wheel is first turned into a center-point position and locked in that position. Each of the front wheel instruments 20, is then, as depicted in FIG. 12, manipulated by turning the knob 79 to pivot the instrument 20 about the axis of shaft 24 until the rearward projected light beam LB strikes the mirror 41 of the instrument 90 on the rear wheel and reflects back to the target 40 on the rear end of the projector 20. The angle $\phi$ or $\theta$ through which the selected projector instrument 20 has thus been pivoted represents the difference in toe between the front and rear wheels on the same side of the vehicle. The value $\phi$ or $\theta$ of that difference will be indicated on the scale F (FIG. 12A) by the amount the scale F on dial 31 is displaced relative to the zero marker Z on casting 22. The foregoing procedure is then performed on the opposite side of the vehicle.

When the foregoing procedures on both sides of the vehicle have been completed, the two front wheel projector instruments 20 are now parallel with the plane of rotation of their respective rear wheels, and the total toe between them equals the value of $\alpha$ which is the total toe of the rear wheels 14 and 15. Thus, the thrust line of the rear wheels will be the bisector of the angle between these two instruments. To find the individual toe of the front wheels 12 and 13 relative to the thrust line as determined above, half the total toe (the bisected angle) of the rear wheels 14 and 15 must be added (or subtracted as applicable) to the measurements of front versus rear toe on each side.

Since the light beam being projected across the width of the vehicle (from housing 46 on wheel 12 to housing 46' on wheel 13) is initially normal to the axis of the projector instrument 20 from which it is projected as denoted by beam C (for the left front instrument) in FIG. 12 it will not be normal to the axis of the instrument 20 on the opposite side unless there is no toe between the rear wheels 14 and 15 and, therefore, between the two projector instruments 20. The transversely projected light beams must be pivoted through an angle $\alpha$ equal to the total rear toe in order to have them strike the mirrors on the opposite instruments and reflect back to a target centered on the point from which the light was originally emitted and thus make them normal to the opposite instrument. This new position is represented as D in FIG. 12.

Figure 12B:
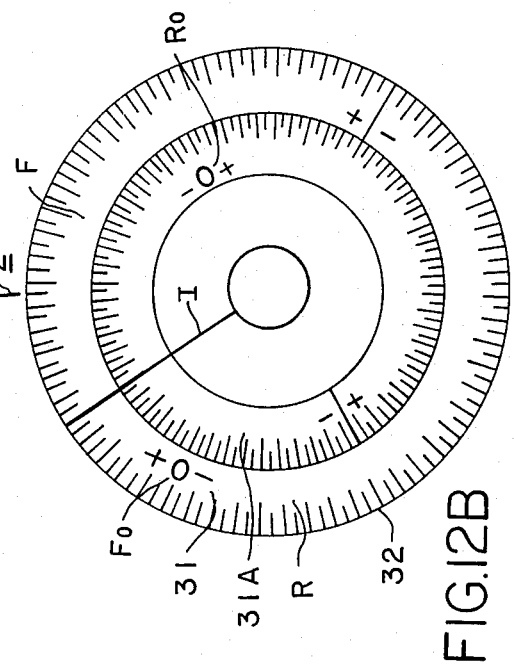
FIG. 12B is similar to FIG. 12A but for a further manipulation of the instruments and dials.

As set forth above, the mechanism provided to adjust the angle of the mirror 53 to pivot the light beam A (FIG. 10) relative to the longitudinal axis of the instrument 20 in which it is mounted is mechanically linked by shaft 71 and bevel gears 71A and 73 to shaft 30 (See FIG. 4) and then to the transparent dial 32. As the knob 68 is rotated, it pivots the mirror 53 to vary the angle of reflection of the light beam A, and the indicator pointer I on dial 32 rotates an amount corresponding to half the angular movement of that reflected light beam. Since the movement of the light beam from position C to D is equal to the total rear toe, the indicator 32 is moved an amount equal to half the total rear toe (the bisected angle). The individual toe vs. thrust line is then indicated by (FIG. 12B) the relative position of the pointer I on the transparent dial 32 and the scale F on the dial 31. This procedure is repeated on the instruments at the opposite side of the vehicle. Then once the dial scale readings have been indicated, the respective instruments 20 are pivoted about the axis of shaft 24 by turning knob 79 until the desired front wheel toe value is read between the pointer I on the transparent dial 32 and the scale F on dial 31. Now with the steering wheel in its center point setting and locked, as before described, the tie rod under the vehicle can be adjusted to bring the instruments 20 back so the beams LB return to alignment with the rear wheels. That alignment is reached when the rearward light beams LB are reflected off the mirrors 41 of instruments 90 and strike the targets 40 on the instruments 20. The toe alignment of the front wheels is completed.

Procedure For Performing Rear Wheel Alignment

A procedure for performing rear wheel alignment is carried out in the following manner: Instruments 20 and 90 are mounted on the respective wheels 12–15, leveled and runout compensation is made. After these preliminary steps are completed, the first subsequent step is to determine the rear wheel toe condition which is done as follows:

1. Determine rear wheel toe (see FIGS. 10 and 11).

(a) set both dials 31 and 31A so the scales F and R on those dials have the zero index $F_o$ and $R_o$ aligned with the zero index Z on housing 22, and the pointer I on dial 32 is also aligned with the zero Z index (forward instruments).

(b) loosen lock knob B and level forward instrument 20, then tighten lock knob B.

(c) loosen lock knob B' and adjust aft instrument 90 to allow the horizontal line of the reflected image to be approximately centered on the target 40 mounted on the forward instrument 20.

(d) steer front wheels 12 and 13 until the beams LB being projected rearwardly from each of the forward instruments 20 strikes the same number on the scales 91 of each rear instrument 90, as in FIG. 10. Lock the steering wheel to hold the front wheels steady.

(e) using forward adjusting knob 68, rotate the forward (transverse) light beam A from mirror 53 until it strikes the mirror M on the opposite instrument 20 and is reflected back and centered on its target P (see FIG. 6). Repeat for opposite instrument 20.

(f) using the adjusting knob 79, pivot the forward instrument 20 until the light beam LB being projected rearwardly strikes the mirror 41, on its corresponding instrument 90 and is relected back and centered on the target 40 mounted on the forward instrument 20. Repeat for opposite side.

(g) read the toe of the individual rear wheels vs. the vehicle geometric centerline as shown by the position of the pointer I on dial 32 to the scale R on dial 31A on the corresponding forward instrument 20.

Once the procedure is completed, then go to the following steps for setting rear wheel toe: It is assumed that the rear wheels can be adjusted for toe alignment.

2. Set rear toe (a) using the adjusting knob 79 on the instrument 20, set the scale R on dial 31A, relative to the pointer I on dial 32, to reflect the desired toe setting for the rear wheel on that side.

(b) adjust the toe of the rear wheel until the beam LB projected rearwardly from the forward instrument 20 strikes the mirror 41 of the rear instrument 90 and is reflected back and centered on the target 40 mounted to the rear end of the forward instrument 20.

(c) repeat steps 2a and 2b for the remaining rear wheel.

Procedure for Performing Front Wheel Toe Relative to "Thrust Line" Alignment

1. Mount instruments as explained above.
2. Perform runout compensation as explained.
3. Determine the toe of the front wheels 12 and relative to the thrust line TL (FIG. 12);

(a) center and lock the vehicle steering wheel.

(b) loosen lock knob B and level forward instrument 20. Tighten lock knob.

(c) loosen lock knob B' and adjust rear wheel instrument 90 to allow the horizontal line of the reflected reticle in beam to be approximately centered on the target 40 mounted on the forward instrument 20.

(d) using the adjusting knob 79 on the instrument 20, pivot the forward instrument 20, until the image LB being projected rearwardly strikes the mirror 41 on its corresponding instrument 90 and is reflected back and centered on the target 40 on the forward instrument 20. Repeat for opposite instrument.

(e) using the adjusting knob 68 on the instrument 20, pivot the transverse beam A until it strikes the mirror M on the opposite instrument and is reflected back and centered on the target P. Repeat for opposite instrument.

(f) read the toe of the individual front wheels vs. "thrust line" as shown by the position of the pointer I on dial 32 relative to the scale F on dial 31 on the corresponding forward instrument 20.

4. Set front toe (a) using the adjusting knob 79, set the dial scale 31, relative to the pointer 32, to reflect the desired toe setting for that wheel.

(b) adjust toe of that wheel until the projected image LB strikes the mirror 41 and is reflected back and centered on the targets 40.

(c) repeat for the opposite side.

Since both the transverse and rearwardly projected beams A and LB were centered on their targets prior to step 4a, the adjustment performed in step 4b will cause both beams to return to the center of their targets simultaneously. As a result, either target may be viewed while making the toe adjustment.

(d) repeat steps 4a and 4b on the opposite side of the vehicle.

Toe alignment procedure is now complete.

The foregoing specification has set forth the presently preferred embodiment of structure disclosed in the drawings, and has described the method and utility of the structure in the field of vehicle wheel alignment art. The teachings of this disclosure may suggest variations which may be substantial equivalents of the structure or its method of use, all within the scope of the subject matter herein.

What is claimed is:

1. The combination of active and passive instruments for use in determining the alignment relationship between the front and rear wheels of a four wheel vehicle, the instruments of the combination comprising:

(a) passive instruments on each of the rear wheels, each having a light beam reflecting mirror and scales; and (b) active instruments on each of the front wheels, each of said active instruments including:

1. an elongated body pivotably carried by the front wheel in position to point one end toward a passive instrument on the same side of the vehicle, and to extend an opposite end beyond the front wheel so as to be in line of sight with a similar end of a similar elongated body carried by the companion front wheel;

2. A source of light in said body for projecting a first light beam in a direction toward the passive instrument, and for projecting a second light beam internally toward said opposite end of said body;

3. light beam reflecting means pivotably mounted in and adjacent said opposite end of said body for receiving the internally projected light beam and reflecting that internal beam laterally outwardly of said body at an angle to the internally projected light beam for striking a similar body on the companion steerable wheel;

4. first manipulative means operably mounted adjacent said elongated body carried by that front wheel for effecting pivoting movement of said elongated body in a horizontal plane;

5. second manipulative means operably mounted on said opposite end of said elongated body for pivoting said light beam reflecting means mounted therein for changing the angular direction of light beam reflection; and 6. visual means associated with said elongated body and being rendered responsive to said first and second manipulative means for mutual cooperation in visually displaying the extent and direction of pivoting movement of said elongated body in the horizontal plane, as well as the extent and direction of pivotal movement of said light beam reflecting means.

2. An angle measuring instrument for use in measuring the alignment relationship of vehicle front and rear wheels to a vehicle longitudinal axis comprising:

(a) an elongated body member having a front and a rear end;

(b) a source of light mounted in said body member between said ends for emitting a beam of light from its mounted position in opposite directions longitudinally of the length of the body member;

(c) an opening in the rear end of said body member for emitting the beam of light;

(d) a reflective surface mounted for pivotal movement in said elongated body member adjacent the front end and an opening in said elongated body member adjacent said reflective surface for emitting a beam of light reflected laterally of the body member;

(e) means connected between a vehicle wheel and the elongated body member having a first part fixed to the wheel and a second part fixed to said elongated body member and pivotally connected to the first part for pivoting movement of the elongated body member about a vertical axis;

(f) first position adjusting means in said second part for pivoting said elongated body member about the vertical axis;

(g) second position adjusting means connected to said reflective surface for changing the axis of the beam of light reflected through said opening in the front end of the elongated body member adjacent said reflective surface; and (h) a pair of indicator means on said second part independently responsive, one to said first position adjusting means, and the other to said second position adjusting means for following the angle of pivoting movement of the elongated body member and the effect of the degree of angular adjustment of the reflective surface on the emitted light beam.

3. The angle measuring instrument set forth in claim 2 wherein said pair of indicator means on said second part include a pair of dials each having a face surface carrying a scale having a markings representing degrees of angle and a zero index representing a zero angle; and a member presented adjacent said pair of dials and presenting a reference index thereon movable over the scales on said face surfaces of said pair of dials for selective alignment with a marking which denominates a certain degree of displacement of said reference index relative a scale marking on one of said dials.

4. The angle measuring instrument set forth in claim 3 wherein said pair of dials are each opaque bodies and said adjacent member is a transparent dial, so said scales thereon are rendered visible therethrough for locating said reference index over a scale markings on one or both of said opaque dials.

5. The angle measuring instrument set forth in claim 2 wherein said first position adjusting means in said second part includes a first pair of meshing gears, one of said gears being operatively connected to said second part, a manually manipulative member is connected to said other of said pair of meshing gears, said manually manipulative member effecting response of said pair of indicating means; a dial operatively carried on said second part; and said second position adjusting means including a second pair of meshing gears, one of said second pair of gears being operatively connected to said second position adjusting means, and the other one of said second pair of gears being operatively connected to said dial for causing the dial to respond thereto; and manually manipulative means connected to said one of said second pair of gears for adjusting said reflective surface.

6. The angle measuring instrument set forth in claim 5 wherein said pair of indication means carries scales divided into degrees of arc, and said dial is a transparent member carrying a reference index, said dial being presented to said pair of indicator means to render said scales visible, whereby said position of said reference index is visibly alignable over said scales.

7. In vehicle wheel alignment instrumentation for checking the alignment of vehicle front and rear wheels, the combination comprises:

(a) active instruments operably carried on each front wheel and having means arranged to project first light beams therebetween and other means in position to project second light beams between front and rear wheels;

(b) passive instruments carried on each rear wheel in position to receive a light beam from an active instrument on the same side of the vehicle and reflect the light beam back toward said active instrument at the same side;

(c) means carried by each of said active instruments for selectively manipulating the position of each active instrument relative to the front wheel by which each said active instrument is carried, thereby manipulating said first light beam projector means and said other means to project said second light beam; and (d) alignment data display means movable in response to the manipulation of said first light beam projector means and said other means to project said second light beam for visually displaying alignment data.

8. The combination set forth in claim 7 wherein each of said active instruments carried on a front wheel is mounted thereon for pivoting movement about a vertical axis; and wherein said manipulating means for each active instrument comprises rotary means for effecting said pivoting movement of said active instrument; and said alignment data display means includes a rotary dial responsive to said manipulating means for displaying the angular position of pivoting movement of said active instruments.

9. The combination set forth in claim 7 wherein each said active instrument carries means to reflect and to project said light beams; and wherein said manipulating means is adapted to select the direction of the projected light beam and concurrently effect movement of said alignment data display means for visually displaying alignment data.

10. A method for determining the alignment of the rear wheels of a four wheel vehicle using light beam emitting alignment active instruments on the front wheels and light beam reflective passive instruments on the rear wheels for determining the rear wheel alignment relative to the geometric center line of the vehicle, the method comprising the steps of:
(a) compensating the positions of the active and passive alignment instruments for wheel runout;
(b) initially manipulating the active instruments into positions parallel with the planes of rotation of the front wheels and projecting light beams transversely between the respective active instruments at right angles to the respective active instruments;
(c) providing visual means on the active instruments to respond to the manipulation of the active instruments and thereby confirm the attainment of the position of the active instruments upon completion of the initial manipulation;
(d) steering the front wheels into positions in which projected light beams strike the passive instruments at substantially the same distance from the planes of rotation of the rear wheels;
(e) manipulating the transversely projected light beam within each active instrument until they are reflected to return in coincidence with the path along which they were originally projected which results in them being positioned at right angles to the respective opposite instrument;
(f) manipulating the active instruments into second positions in which the light beams projected toward the passive instruments are reflected to return to the active instruments in coincidence with the path of the light beams projected toward the passive instruments resulting in the active instruments being aligned with the plane of rotation of the rear wheels; and
(g) reading the visual means after completing the manipulation of the active instruments into the second positions to ascertain the angular position of the rear wheels relative to the geometric centerline of the vehicle.

11. The method recited in claim 10 including providing measuring scales on the passive instruments for confirming the attainment of the position of the projected light beams being at substantially the same distance from the planes of rotation of the rear wheels.

12. The method recited in claim 10 including manipulating the visual means on the active instruments into positions in which the axis of the active instruments are in positions relative to the plane of rotation of the front wheel to represent the desired position of alignment of the rear wheels relative to the geometric centerline; and individually adjusting the rear wheels into positions where the passive instruments reflect light beams projected from the active instruments along paths coincident with the projected light beam paths.

13. A method for determining the alignment of the front wheels of a four wheel vehicle using active light beam emitting alignment instruments on the front wheels and light reflective passive alignment instruments on the rear wheels for determining the front wheel alignment relative to the thrust line alignment of the rear wheels, the method comprising the steps of:
(a) compensating the position of active and passive alignment instruments for wheel runout;
(b) initially manipulating the active instruments into positions parallel with the planes of rotation of the front wheels and projecting light beams transversely between the active instruments at right angles to each active instrument from which they project;
(c) providing visual means on the active instruments which respond to the manipulation of the light beams and the active instruments and thereby confirm the attainment of the positions of the active instruments upon completion of the initial manipulation and light beam projection transversely at right angles thereof;
(d) manipulating the light beams projected from the active instruments along a path to strike the light reflective passive instruments whereby the reflected light beams return along a path coincident with the original path of the projected light beams, resulting in the active instruments being aligned with the planes of rotation of the rear wheels;
(e) manipulating the transversely projecting light beams on the active instruments to bring the transversely projected light beams from the respective instruments into angular positions in which such projected light beams follow paths which strike the opposite active instruments and are reflected back in paths coincident with the paths followed by the projected light beams which results in them being positioned at right angles to the respective opposite active instruments; and
(f) reading the response of the visual means to find the individual front wheel toe values relative to the thrust line alignment of the rear wheels.

14. The method recited in claim 13 including manipulating the active instruments into positions reflecting the desired front wheel toe value and simultaneously causing the light beams projected to strike the passive instruments to assume a path, which when aligned with the corresponding rear wheel, will result in the desired front wheel toe; and adjusting the position of the front wheels in directions to move the active instruments on the front wheels until the light beams projected to strike the passive instruments are reflected back to the active instruments along paths coincident with the paths followed by the projected light beams.

* * * * *